US007311865B2

(12) United States Patent
Williamson

(10) Patent No.: US 7,311,865 B2
(45) Date of Patent: Dec. 25, 2007

(54) BLOCK-RAMMING MACHINE

(76) Inventor: Larry Don Williamson, Rt. #1, Box 156A, Ranger, TX (US) 76470

( * ) Notice: Subject to any disclaimer, the term of this patent is extended or adjusted under 35 U.S.C. 154(b) by 301 days.

(21) Appl. No.: 10/800,170

(22) Filed: Mar. 12, 2004

(65) Prior Publication Data

US 2005/0202115 A1 Sep. 15, 2005

(51) Int. Cl.
*B29C 47/00* (2006.01)
*B29C 47/10* (2006.01)

(52) U.S. Cl. ........................................ 264/148; 425/255

(58) Field of Classification Search ................ 264/148; 425/253, 255

See application file for complete search history.

(56) References Cited

U.S. PATENT DOCUMENTS 768,127 A * 8/1904 Jaques ........................ 425/313
3,008,199 A * 11/1961 Jeppesen ..................... 164/22
3,225,409 A * 12/1965 Huffaker ..................... 425/209
3,421,220 A * 1/1969 Stanga ........................ 53/440
3,458,953 A * 8/1969 Moses et al. ............ 47/58.1 R
6,347,931 B1 * 2/2002 Underwood ................. 425/62

* cited by examiner

*Primary Examiner*—Christina Johnson
*Assistant Examiner*—Patrick Butler
(74) *Attorney, Agent, or Firm*—Bracewell & Giuliani LLP

(57) ABSTRACT

A compaction unit (100) includes (a) an elongated open-ended ramming chamber (50) having a fill port opening (51). A ramming head (20) pushes material within ramming chamber (50) to add a new lift to a continuous homogeneous block (40) comprised of all previously compressed material. As the ramming head (20) moves forward, it closes off the fill port opening (51). A shearing chamber (60) fractures the blocks to any desired length, while a support platform (70) supports and stores the blocks until utilized. The shearing chamber (60) moves transverse to the ramming chamber to form the fracture.

19 Claims, 8 Drawing Sheets

END VIEW

TOP VIEW

BLOCK-RAMMING MACHINE

BACKGROUND

1. Field of the Invention

This invention relates to ramming machines particularly those used in the production of Compressed Earth Block, Stabilized Compressed Earth Block, and other similar material units.

During the next 20 years, the world's human population is expected to double. Considering what is happening to the worlds' ecosystems, this increased demand for food and fiber is likely to be the deathblow for many of our natural treasures. If we are to preserve the quality of life on this planet, then the rapid development and implementation of technology that helps to protect the natural environmental is essential. One such technology produces building blocks from locally available soils or earth. Compressed Earth Block (CEB) and Stabilized Compressed Earth Block (SCEB) construction is a time proven, ecologically friendly building system. These blocks require very little energy input to produce unlike the processed materials utilized in concrete, wood frame, or steel construction methods. This makes CEB and SCEB about 70% cheaper to produce and utilize when compared to other construction methods. CEB or SCEB walls that are greater than 22" thick also provide an excellent "thermal storage unit" for passive solar housing. Even without solar gain or insulation, this massive wall system is 70% more energy efficient to heat and cool than other construction technologies. Other advantages of CEB and SCEB construction include being fireproof, bug-proof, and hypoallergenic. In addition, when CEB and SCEB walls of over 22" thick are properly constructed the resultant structure can be tornado, hurricane, and earthquake proof as well. And with new waterproofing systems CEB and SCEB can be constructed anywhere in the world, from the rainforests of the tropics to the high deserts. Thus a major improvement in CEB and SCEB production methods and utilization technology can provide shelter for billions of additional people while helping to conserve our precious natural resources.

2. Discussion of Prior Art

All current state of the art machines share a common feature. They utilize a completely enclosed mold or compression chamber usually with a hydraulic cylinder providing compression to the chamber to produce one block at a time. A few machines can vary one dimension of the block being produced by varying the length of the compression stroke. However, ultimate block size is always limited to the size of the mold or compression chamber of an individual machine. And since earth placed under compression exhibits what I call the "bridging effect", this severely limits the ultimate block size that these machines can produce.

A simple explanation of the "bridging effect" is, as earth nearest the ram or applied force compresses it bonds together forming in effect, a "bridge". This layer of dense material effectively transfers any additional applied energy or pressure outwardly (in a chamber—to the chambers walls) effectively shielding the underlying material from the applied pressure. The "bridging effect" thus limits the amount of earth that we can effectively compress or compact at one time. The same principle holds true for other earthen construction projects. Highway Engineers restrict maximum "lift" depth to 8" of loose earth during roadbed construction. Experience has taught them that it is almost impossible to achieve a high-density (98% Standard Density) roadbed if you try to compact more than 8" of loose earth in a single lift. The same holds true for CEB and SCEB production. Since loose earth shrinks by roughly 50% during the compaction process due to the removal of air, this leaves about 4" of compacted road base. Thus we can conclude that after 4" of compressed material accumulates then the "bridging effect" will start to severely affect compaction efficiency. And, although compacting earth within a chamber is more efficient than compacting earth in a roadbed, in a CEB machine, the maximum block size when measured through the dimension of applied pressure should never exceed 6" (compacted thickness) or a significant loss of density will likely result. The only way to overcome this 6" limitation is to apply extreme amounts of additional compaction pressure, which is entirely possible but not at all economical. This is the main reason present (state of the art) CEB machines restrict their production to small blocks, usually less than 4" thick when measured through the dimension of applied force. This relegates them to producing blocks of less than 40 lbs and generally less than 20 lbs. Remember, all blocks presently produced are laid utilizing manual labor. Indeed, the focus of the prior art has always been tilted towards increasing the speed of production and not block size.

Unfortunately, this lack of block size restricts CEB and SCEB construction projects in developed nations, to mostly high-end custom projects due to the high manual labor costs involved. It has also limited the wall thickness of most CEB projects to less than 14". While this is structurally acceptable, CEB and SCEB walls need to be at least 22" thick to take full advantage of their thermal storage properties. Which means that most CEB and SCEB walls being built presently need to be insulated just like other building systems. Thus, due to the limitations imposed by present state of the art production technology, CEB and SCEB construction has not been utilized nor accepted by industrialized cultures as the energy efficient low cost building system that it should be.

If we are going to modernize the technology and make it more acceptable to industrial societies then human labor to lay the blocks must be replaced by mechanical equipment. This will require a CEB and SCEB machine capable of producing large blocks that can be efficiently handled and placed utilizing standard construction equipment. This will require CEB machines capable of producing blocks that are between 100 lbs. and 500 lbs. for economical placement by a standard sized backhoe. A large commercial project might require CEB blocks between 1 and 5 tons for economical placement utilizing large excavators, cranes, or other equipment common to this environment. Not only will this lower the cost of installation for CEB and SCEB construction, but these massive blocks fit perfectly into the thermal efficiency requirements for earthen construction.

Thus, all that can be said for the present (state of the art) machines is that they have improved the quality and speed of CEB and SCEB production. However, it is still necessary to utilize a 6,000 year-old technology to manually place the blocks within a building system. In this regard we have regressed as many ancient cultures were far more advanced in the utilization of earthen construction than we are. This allowed them to build great civilization centers containing hundreds of thousands of people while causing a minimum of damage to their natural environment. While we think of the ancient Egyptians, Incas, and Aztecs as great builders with rock, it was earthen housing of the masses that allowed their civilizations to flourish. Not that we need to copy the past, but we should be willing to combine the best of the past with the best of the present to produce what is best for the future.

My ramming invention has only one thing in common with a current (state of the art) machine. They are both capable of producing a compressed earth block. The means and method by which this is accomplished is however, totally different. Indeed, all I can list as prior art are examples of dissimilar design and method. This becomes readily apparent upon examination of the art.

3. Description of Prior Art

Underwood, U.S. Pat. No. 6,347,931 issued Feb. 3, 2000 describes an apparatus for forming building blocks, which features a fill chamber followed by a ramming (i.e., compression) chamber that is blocked by a headgate. The earthen block is compressed by a hydraulic ram pushing the material against the headgate then the headgate is opened to eject the block.

Kofahl U.S. Pat. No. 5,919,497 issued July 1999 describes an apparatus for forming building blocks. In operation, a soil/cement mixture is loaded into the upper end of the compression chamber, a sliding gate is slid shut, and a ram compresses the mixture against the gate.

Elkins U. S. Pat. No. 4,579,706 issued April 1986 describes an apparatus for making blocks from earth, soil, or like material. This patent utilizes two enclosed compression chambers and alternates between them to speed production.

As is readily apparent, all the above-mentioned patents utilize completely enclosed compression chambers to form a particular sized block.

An example of current (state of the art) machines on the market includes the “Impact 2001”, and the “Compressed Soil Block Machine” manufactured by Advanced Earthen Construction Technologies, Inc. of San Antonio, Tex. Other examples of CEB machines includes the “Terra-Block 250” manufactured by Terra-Block International, Inc. of Florida and the “HBP 250” manufactured by Vermeer Manufacturing, Inc. of Iowa.

All the above stated machines feature micro-processor controlled automated production cycles and high output capabilities, but they all produce blocks of such small size as to require manual labor to handle and lay the blocks within a building system. None of the above stated machines can feasibly be adapted to produce blocks of over 100 lbs. And none of the above stated machines can produce blocks with a variety of lengths without changing out the mold in the compression chamber.

Objects and Advantages

It is therefore an object of this invention to provide a compaction unit of simple design that can produce blocks of relatively high-density with very consistent height and width, and infinitely variable yet controllable length.

It is also an object of this invention to provide a compaction unit that utilizes the previously compacted material (lifts) as an integral part of the unit.

It is a further object of the invention to provide a compaction unit with a ramming head that by design and function increases the “frictional threshold” or resistance to movement of the material being compressed within the ramming chamber.

It is yet another object of this invention to provide a compaction unit that can produce blocks with interlocking features, or channels/chases for carrying wire, reinforcing steel, or piping.

It is another object of this invention to provide a relatively small machine that can produce blocks of sufficient size that they can be efficiently handled (individually) and placed within a building system by standard construction equipment.

It is yet a further object of this invention to provide a machine that can be used as a stationary manufacturing facility, or can be trailer mounted for easy transport to and around the job site.

It is still yet another object of this invention to provide a ramming machine that utilizes at least two compaction units driven by a single power source to increase the speed of production.

It is another object of this invention to provide a ramming machine that can be controlled manually, semi-automatically, or can be fully automated having a microprocessor with programmable production schedules and radio input capabilities.

It is still another object of this invention to describe a process whereby blocks produced by this ramming machine are efficiently placed (individually) within a building system utilizing standard construction equipment.

BRIEF DESCRIPTION OF THE DRAWINGS

The above and other objects and advantages of the invention will become apparent upon consideration of the following detailed description, taken in conjunction with the accompanying drawings. In which, like reference characters are used to refer to like parts throughout, and closely related figures have the same number but a different alphabetic suffix, and in which.

REFERENCE NUMERALS IN THE DRAWINGS

Figure 1A:
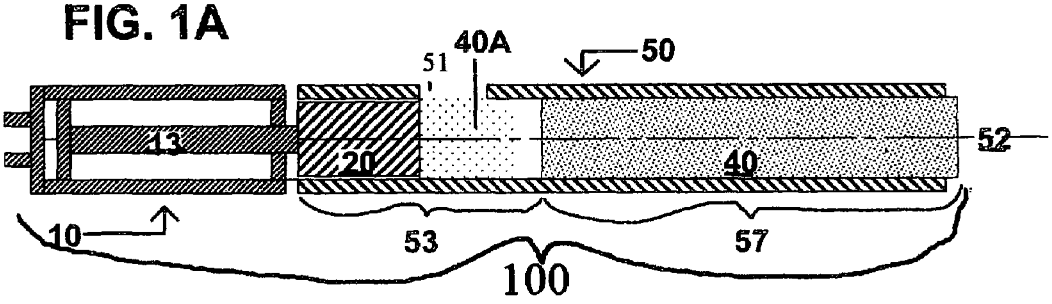
FIG. 1A to 1D is a sectional side view of a basic compaction unit showing internal detail and the compaction cycle in various stages of completion.
Figure 1B:
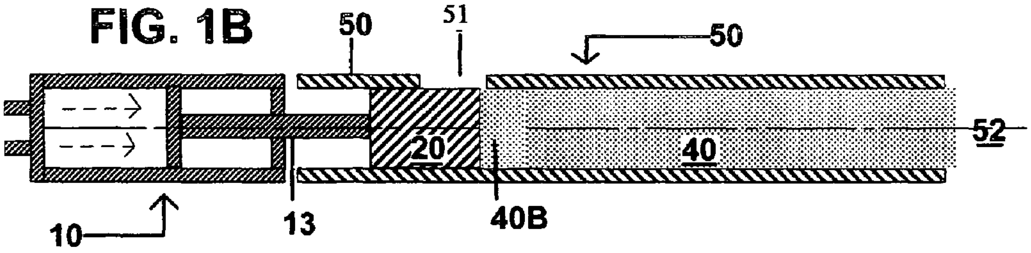
Figure 1C:
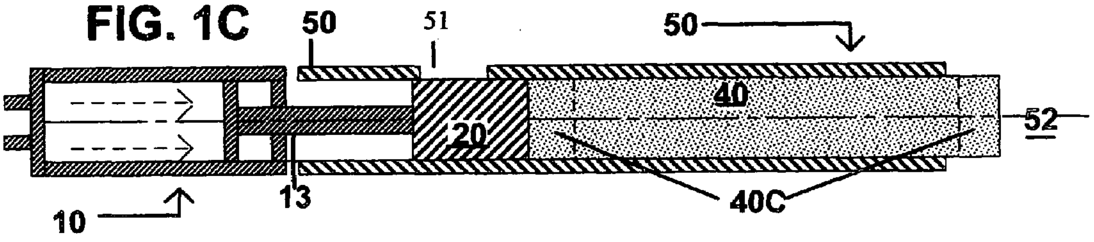

| Compaction unit 100 | |
|---|---|
| Hydraulic cylinder 10 | Ramming head 20 |
| 13 piston rod | 21 ramming face-plate |
| 15 hole | 22 special design feature |
| 17 steel end plate | 24 sealing top plate |
| 19 support structure | 26 steel angle brace |
| | 28 cylindrical collar |
| Continuous homogeneous block 40 | Elongated ramming chamber 50 |
| 40A loose block-making material | 51 fill port opening |
| 40B newly compacted lift | 52 longitudinal bore |
| 40C previously compacted lift | 53 compression end |
| | 57 extrusion end |
| Shearing chamber 60 | |
| 61 side support plate | 62 steel bar-stock |
| 63 channel structure | 64 fulcrum (steel shaft) |
| 65 pillow block bearing | 66 bolt |
| 67 cylindrical roller | 68 lever (steel plate) |
| Block support platform 70 | |
| Hopper 80 | Trailer 90 |

Conventional components are shown within rectangular boxes in the drawings and are represented in the written specification by capital letters within parentheses. This includes:

(M)—an electric motor, or any internal combustion engine.

(HP)—a hydraulic pump including gear, axial piston, two-stage, variable displacement piston, etc.

(MD)—electronic measuring devices, roller type measuring devices, lazer rangefinders, physical rods with trip switches, etc.

(SD)—pressure gauges, sensory switches, temperature gauges, motion detectors, infrared devices (MP)—a microprocessor with associated control devices, or a computer with wireless networking capabilities (CD)—control devices includes switches, proportional actuators, latching actuators, and fluid control actuators (CP)—control panel that may include, a master start/stop switch, a emergency shutdown switch, and possibly a microprocessor (HV)—a hydraulic control valve including 4-way control valves with detent, electronic solenoid control valves, one to four spool valves, pressure relief valves, etc.

(PS)—a physical stop

Force→indicates the direction of force (P/M)—a pulvi/mixer, screen/pugmill, or hammermill/mixer combination (L)—a complete liner, a partial liner, a rail or rails, or a wear plate or plates (RR)—a wireless radio receiver, or "Blue Tooth" technology, wireless computer networking technology, or wireless internet technology (SP)—self-propelled unit including track or wheel driven varieties

SUMMARY

In accordance with this invention a basic compaction unit is comprised of a simple elongated ramming chamber, a ramming head, and a hydraulic cylinder. By utilizing the inherent properties of the material (e.g., earth) being compacted, the previously compacted material functions as an integral part of the compaction unit. This allows a basic compaction unit to fuse together a series of "lifts" to produce a continuous homogeneous block of relative high-density. By adding a hopper, a shearing chamber, and a block support platform to my basic compaction unit, I create a relatively small block-ramming machine that can produce blocks of infinitely variable yet controllable length. Blocks produced by my block-ramming machines are normally too large to be handled with human labor. So, I also describe a simple yet effective process that utilizes common mechanical construction equipment to efficiently hoist and place the blocks within a building system.

Description of a Basic Compaction Unit of My Design

A sectional side view of a basic compaction unit 100 of my block-ramming machine is illustrated in FIG. 1A of the drawings.

A basic compaction unit 100 is provided that includes:

An elongated ramming chamber 50, which has a longitudinal bore 52, a compression end 53, and an extrusion end 57. A fill port opening 51 is cut into the topside of ramming chamber 50 at approximately the midpoint of compression end 53. This allows a loose block-making material 40A (e.g., earth) to enter into the compression end 53 of ramming chamber 50.

A ramming head 20 fits closely within the internal dimensions of ramming chamber 50 but can move freely along bore 52 of chamber 50. Head 20 is housed within the compression end 53 of chamber 50 and upon movement, pushes block-making material along the longitudinal bore 52 of chamber 50.

A hydraulic cylinder 10 (part of an actuator) is attached and supported by conventional methods to compression end 53 of chamber 50. This arrangement aligns a piston rod 13 parallel with the bore 52 of chamber 50. Piston rod 13 is conventionally attached to the backside of ramming head 20. When cylinder 10 is activated by hydraulic pressure and flow, piston rod 13 extends and pushes head 20, along with any block-making material 40A present, deeper within compression end 53.

One structural component totally missing from my design is the tailgate or headgate, against which the block is normally compressed. By utilizing the inherent characteristics of compressed earth or similar material, I can completely eliminate a structural tailgate from my design. Instead of a tailgate, I utilize all the previously compressed material within extrusion end 57 of my ramming chamber 50 as an integral part of the compaction unit. Thus, a continuous homogeneous block 40 can effectively take the place of a tailgate as it were. This not only simplifies the construction of the basic unit but it also affords some very unique characteristics to the production cycle. This unique design not only produces a singular high-density block, which I call a "lift", with each compaction cycle of the unit, but it also allows a new lift 40B to be fused together or combined with a previously compacted lift 40C to form the continuous homogeneous block 40 that exits the unit. Block 40 completely fills extrusion end 57 exerting a tremendous amount of pressure and friction against the interior walls of ramming chamber 50. I call this friction or resistance to movement the "frictional threshold" value of a particular compaction unit. I can easily regulate the amount of frictional threshold for a given compaction unit by simply adjusting the length of extrusion end 57 during initial construction. The longer extrusion end 57 is, the higher the frictional threshold value will be, conversely, shortening extrusion end 57 lowers the amount of frictional threshold. Thus, by controlling the amount of hydraulic pressure applied to a rather constant amount of block-making material (e.g., earth) and by balancing that against a relatively constant frictional threshold of a particular unit. I can construct compaction units for a multitude of different block sizes and for each one be assured that I can replicate the optimum conditions for the formation a high-density lift. During the process each new lift 40B is fused with a previous lift 40C to form a continuous homogenous block 40 that exits my compaction unit. Therefore, my means and method of forming CEB and SCEB blocks is totally different from the prior art.

Description—Conventional Components

Since I use a lot of conventional components to complete the various embodiments of my block-ramming machines, I indicated them within a rectangle in the drawing and by capital letters within parenthesis in the written text. Thus a motor is indicated by (M) and can represent an electric motor, a diesel engine, or any internal combustion engine. I indicate a hydraulic pump by (HP) which represents gear pumps, axial piston pumps, two-stage pumps, variable displacement piston pumps and so on. I represent a sensor device by (SD) which includes pressure gauges, motion detectors and temperature gauges to mention a few. I represent a measuring device by (MD) which includes physical sight rods or rods with trip switches, roller counters, and lazer measuring devices. I represent a hydraulic valve by (HV) which includes manual 4-way valves with detent, 1 to 4 spool valves, electronic solenoid valves, master control valves, pressure relief valves, proportional valves, and detent valves among others. I represent a control panel by (CP) which can be a master control panel with start/stop switches, emergency stop switch, and may include a microprocessor. I represent a microprocessor with associated control devices by (MP), which includes data storage, operating system, and input devices necessary to completely control the entire operational functions of a large complex block-ramming machine. A radio receiver is designated by (RR), which can be cell phone technology, "Blue Tooth" technology, or wireless internet technology. A physical stop is represent by (PS). And an agitation device (AG) can represent a hydraulic auger, conveyor belt feeder, vibrators, or rotating beater shafts with teeth. A pulvi/mixer (P/M) can represent a combined pulverizer/mixer, screen-plant/pugmill or a hammer-mill/mixer combination. A control device is indicated by (CD), which includes switches, toggles, timing devices, and other actuators. A liner is indicated by (L), which can include a complete liner system, a simple rail, or a wear plate.

Description—Additional Desirable Features

A shearing chamber 60 is the most preferred method of cutting the extruded block 40 to any desired length. See FIG. 6A. Block 40 exits chamber 50 and immediately enters into shearing chamber 60. Chamber 60 is held rigidly in place by a sliding mechanism that allows chamber 60 to move only in one plane or axis. Providing movement is a low profile hydraulic cylinder 10 (part of an actuator), which activates a lever 68 over a fulcrum 64 to cause chamber 60 to move and cleanly fracture or split block 40 along the point of contact between the two chambers.

Figure 4:
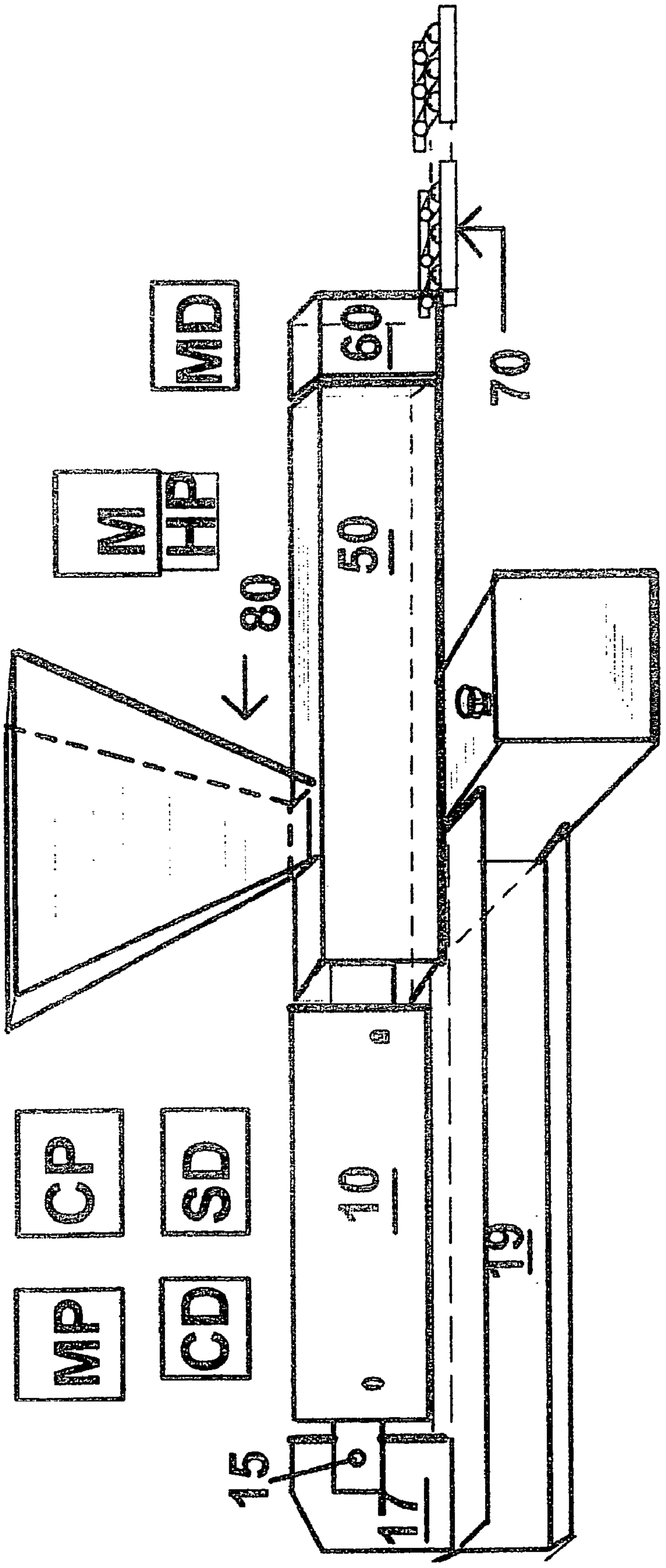
FIG. 4 shows a preferred embodiment of a single compaction unit block-ramming machine mounted on a trailer.
Figure 6A:
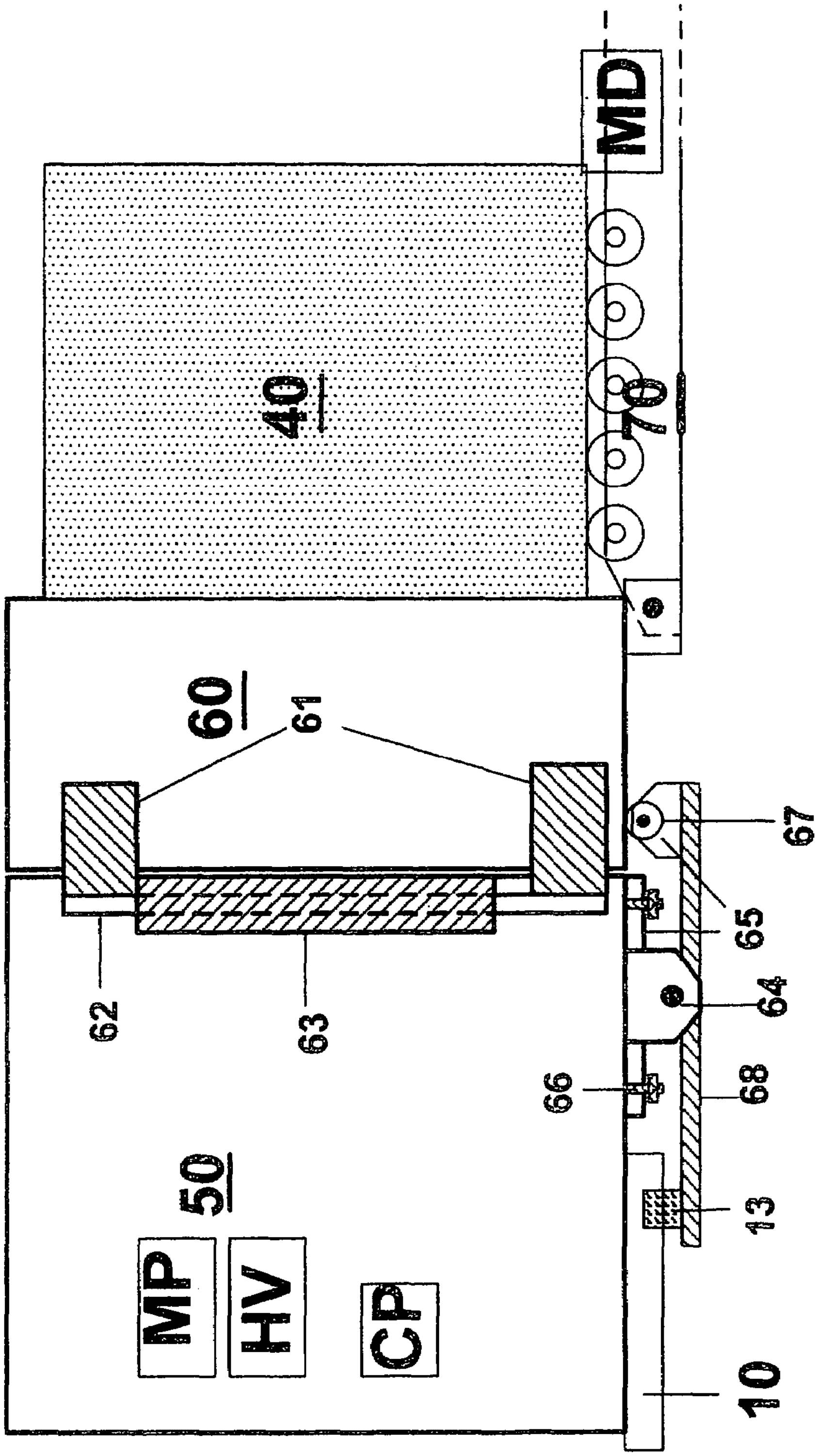
FIG. 6A shows a side view of an illustrative embodiment of a shearing chamber showing the sliding mechanism, the lever and fulcrum mechanism, an actuator, and block support platform.

A block support platform 70 may be comprised of a solid support platform. Or it can be a roller based support platform. Or it can be a conveyor belt type platform. All are conventional and well known within the art. Only the most preferred, a roller support platform 70 is shown in FIG. 4 and FIG. 6A of the drawings.

A conventional hopper 80 is attached to fill port 51 to provide bulk storage of block-making material until utilized by my block-ramming machine.

A basic version of the block-ramming machine, with a single compaction unit mounted on a trailer, features a gasoline engine (M) and a two-stage hydraulic pump (HP) along with all other necessary conventional components of the hydraulic (actuator) system. FIG. 4 expounds upon this preferred embodiment by adding a hopper 80, a shearing chamber 60 and a support platform 70 to complete a highly desirable and useful block-ramming machine.

The most preferred commercial scale embodiments of my block-ramming machine have multiple compaction units 100. Each compaction unit 100 comes complete with its' own shearing chamber 60 and support platform 70. Please see FIG. 5 as an example of this multiple compaction unit block-ramming machine. I prefer to utilize a single large diesel engine (M) equipped with multiple variable displacement axial piston pumps (HP) to supply the required hydraulic flow and pressure to all the compaction units 100. Cycle control for each compaction unit is governed by a single microprocessor (MP) with associated sensor devices (SD), and control devices (CD). A single large hopper 80 with an integrated pulverizer/mixer (P/M), for mixing in stabilizing additives for SCEB production, supplies the various compaction units 100 with block-making material 40A. An agitation device (AG) assures the proper amount of block-making material 40A enters each separate compaction unit. This multi-compaction unit block-ramming machine may be mounted on a large commercial trailer 90 for easy transportation to and around a job site. It may also be a self-propelled (SP) wheel based carrier unit or an army tank based (tracked) carrier version. Self-propelled units (SP) are conventional and not shown in detail in the drawings.

It should be appreciated that my designs can be adapted to utilize any available remote hydraulic power source including farm-tractors, skid loaders, backhoes, track-excavators and the like. Although, the most preferred embodiments have custom tailored hydraulic power sources as an integral part of the machine. Electric powered hydraulic systems are preferred for stationary units.

Conventional components well known to the art are used to control the compaction cycle for any given ramming chamber 50. This may be as simple as controlling the compaction cycle with a manual hydraulic control valve (HV). Or it may involve electronic solenoid valves (HV) and a master control panel (CP) with start/stop switches for semi-automatic operation. Fully automated ramming machines also utilize conventional cycle control components well known within the art to schedule production sequences and monitor machine performance parameters. These units utilize conventional microprocessors (MP), sensory devices (SD), measuring devices (MD), control devices (CD) and radio receivers (RR) to allow for the input of a production sequence from a distance.

Detailed Description of Ramming Chamber 50

Referring to FIGS. 1A-1D. A compaction unit of my design is composed of an elongated open-ended ramming chamber 50 having a longitudinal bore 52. Although it is not absolutely necessary, I prefer to maintain a uniform cross-sectional dimension throughout the bore 52 of ramming chamber 50 to simplify construction. This can take on the shape of a long structural box such as a length of rectangular tubing. But it can also be constructed to a great variety of different elongated shapes as best seen in FIGS. 2A-2D. The interior cross-sectional dimension is; of course, what determines the size and shape of the blocks to be produced. I also prefer chamber 50 to reside in a substantially horizontal plane.

Referring back to FIGS. 1A-1D, chamber 50 can be constructed from heavy steel plate by welding. I prefer hardened tool steel be used as it is resistant to wear. However, if a complex or elaborate shape is desired, manufacture by cast forging is available. The chamber's wall thickness or mass should withstand the internal ramming pressure applied by the hydraulic system without distortion. I also recommend it contain an extra measure of mass to allow for wear, thereby extending the useful life of the compaction unit. Additionally, a liner (L) may cover the inner surfaces of chamber 50 to create several different blocks sizes from one compaction unit. Liner (L) may also be designed to impart interlocking features, or channels/chases into the sides of the CEB produced. Additionally rails or wear plates may be attached to any inner surface of chamber 50. These items are conventional and not shown in the drawings.

Fill port opening 51 is simply an opening cut into the top of the elongated ramming chamber 50 just beyond the area occupied by ramming head 20. See FIG. 1A. Fill port 51 usually starts roughly 20" along the compression end 53 of chamber 50. Normally, I cut a hole roughly 12" in length (twice the maximum compressed lift thickness of 6"). The fill ports' 51 width is always at least 2" narrower than the overall width of a particular ramming chamber 50 for strength purposes.

Detailed Description of Ramming Head 20

Figure 3A:
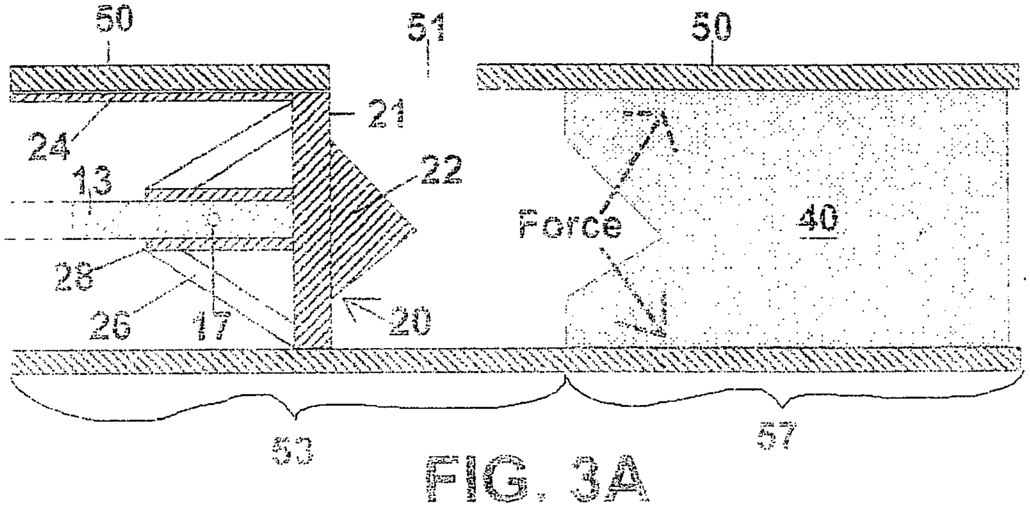
FIG. 3A is a sectional side view of an illustrative embodiment featuring an alternative ramming head design complete with a frictional threshold increasing feature (wedge)

I prefer a solid piece of steel be utilized for the construction of ramming head 20. Head 20 is usually around 20" in length not counting any special friction increasing features. Its cross-sectional dimensions should fit closely within chamber 50, but it should move freely within the compression end 53 of ramming chamber 50 without binding. Of course, head 20 need not be constructed from one solid block of steel. It can be constructed from several pieces of steel welded together. This is best seen in FIG. 3A. A faceplate 21 is constructed of thick steel plate and closely mimics the internal dimensions of chamber 50. A sealing top plate 24 runs parallel to the bore of the chamber and is welded along the top of the plate 21 so that it seals off fill port 51 when piston rod 13 is at full extension. This prevents loose material from entering chamber 50 behind head 20. A steel angle brace 26 is utilized to further support plate 21 and keep it perpendicular to the bore 52 of chamber 50. A cylindrical collar 28 welded to the back of plate 21 attaches to piston rod 13. This may be accomplished utilizing a bolt or steel pin through hole 15 or a threaded collar system may be employed. The attachment of a solid steel head 20 utilizes the same methods. Any head 20 design employed may have wear plates bolted to its' top and bottom surfaces to allow for easy replacement in case of excessive wear.

Figure 3B:
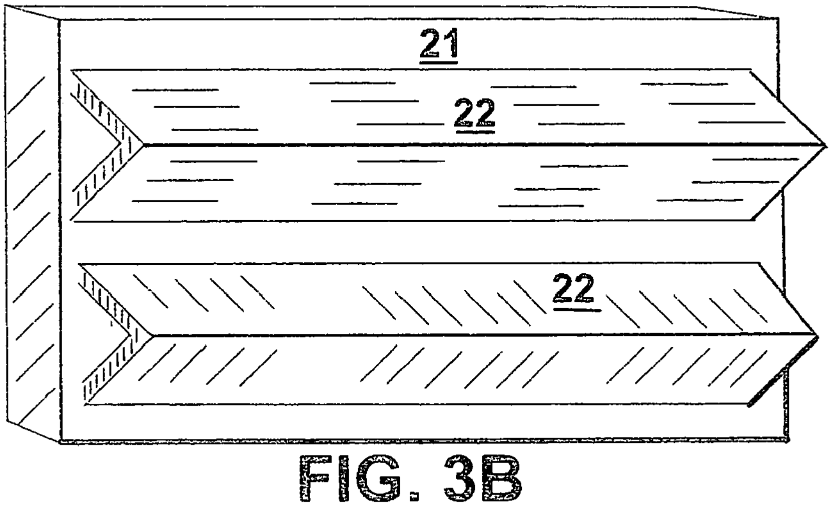
FIG. 3B and 3C show a ramming head with frictional threshold increasing features.
Figure 3C:
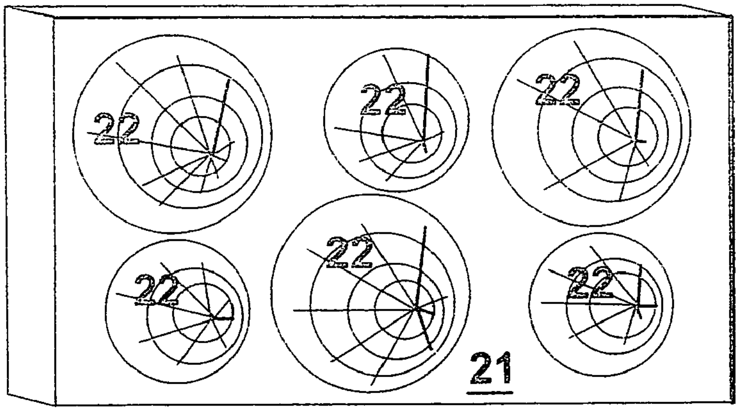

Another design detail that is unique to my invention are the special shapes I incorporate into face 21 of ramming head 20. One such special design feature 22 can be a wedge or multiple wedges attached across the full width of plate 21 of head 20. This is best seen in FIG. 3B. By incorporating these wedge shaped features 22 into plate 21, the material being compacted is forced (F→) towards the outside walls of the chamber as can best be seen in FIG. 3A. This dramatically increases the friction between the new lift 40B and the inner walls of chamber 50. In effect, the material forming the new lift 40B is being compressed from the inside out. This increases the frictional threshold of the unit significantly and allows for a substantial decrease in the overall length of extrusion end 57 of ramming chamber 50. Another example of this design feature can be cone shaped appendages 22 as best observed in FIG. 3C of the drawings.

Detailed Description of Hydraulic Cylinder 10

Hydraulic cylinder 10 or cylinders (part of an actuator) are structurally supported so that piston rod 13 is aligned parallel with the bore 52 of chamber 50. A support structure 19 is welded to the top and bottom of chamber 50 and extends out past cylinder 10. There a steel end plate 17 fully supports cylinder 10. Standard (conventional) tie rod ears and steel pin on this end of cylinder 10 and hole 15 in plate 17 complete the support structure. There are many methods of constructing support structure 19 for hydraulic cylinder 10, all well known to the art. FIG. 4 shows an alternative I-beam support structure 19 and end plate 17.

Rod 13 is attached to the backside of ramming head 20. This can simply be a hole with pin arrangement as can be seen in FIG. 3A, or it can be a threaded attachment system (not shown in the drawing), both methods are conventional and well known to the art. I feel it is important for ramming head 20 to remain fully enclosed (housed) within chamber 50 when cylinder 10 is fully retracted as a matter of safety. When rod 13 is extended it pushes head 20 along the longitudinal axis 52 of chamber 50.

Actuator—Hydraulic System Requirements For My Design

In the present invention my goal is to provide for a compaction unit that is optimized to compact a rather constant amount of material (e.g., earth or stabilized earth) into what I call a "lift". Due to the bridging effect discussed earlier, I strongly suggest that maximum compacted lift thickness never exceed 6". To produce a high-density CEB block it is necessary to achieve a compaction value of 96-99% Standard Density. In order for my compaction units to achieve this value, a compression force of 300-400 lbs pressure per cubic inch (PCI) of compacted volume per lift is suggested.

I start the design process for a given compaction unit by calculating my hydraulic pressure requirement. I simply multiply the total compressed volume of a given lift by the desired compression factor. For example, let's assume I want to produce a block 5" high by 11" wide. I'll also want to do my calculations using the maximum lift thickness to be produced, for the reasons I discussed earlier, in my units this will always be 6" so I use this value. Thus I have 5"×11"×6"=330 cubic inches of total compressed volume per lift. In my case, I like to apply 400 PCI to assure that I will get a very high-density CEB. So, I multiply the 330 cubic inches by the 400 PCI to get 132,000 lbs of pressure. My pressure calculations are not complete at this point, because this is only the amount of pressure necessary to compact "a lift". I also need an additional amount of pressure to overcome the frictional threshold or resistance to movement of the combined lifts 40. To make sure that total system pressure is sufficient, I want to exceed the required compaction pressure by at least 20%. In this case, I multiply the 132,000 lbs of compaction pressure by 120% to get a total pressure requirement of 158,400 lbs.

I also like to design my hydraulic systems with working pressures between 2500-6000 lbs with 5000 lbs as my preferred system operating pressure. I also like for my designs to complete a compaction cycle (formation of one lift) within a certain time frame. For units designed to produce a block height of 12" or less, I prefer the unit to cycle within a 3-6 second time frame. For block sizes larger than 12" in height, it takes longer for the larger volume of earth to feed into chamber 50 so I like to extend cycle times accordingly. I prefer these compaction units to cycle within a 4-10 second time frame.

Instead of having to do a lot of complex engineering calculations for the rest of the hydraulic system, I prefer to compare what a particular machine (block size) of my design needs (working pressure and flow rate) and then adapt the hydraulic system from a modern hydraulic excavator for my components. Since the design engineers of the hydraulic excavator have already balanced the hydraulic system components (including motor and hydraulic pump combinations). It's simply a matter of establishing the required working pressure and flow rates necessary to produce a particular block size. And then, compare the specification for different sized excavators to choose the correct hydraulic system components. For example a small Kubota excavator model Kx-91-2 features a 27.2 horsepower diesel engine with 2 variable-displacement piston pumps rated at 10.9 gallons/minute (GPM) each and a single 4.9 GPM gear pump. System operation pressure is 4500 PSI. This particular excavators' hydraulic system is adaptable to several smaller block, single compaction units of my design. For large multi-compaction unit machines of my design the New Holland excavator model EC350 components might be utilized. It features a 249 horsepower turbocharged diesel engine with 3 variable-displacement, axial piston pumps delivering 75.3 GPM each, along with a single gear pump rated at 51.5 GPM. System operating pressure is 5076 PSI. All the other components of the excavators hydraulic system can be utilized as well including reservoir capacities, manual and electronic control systems, and filtration systems. And since anyone skilled in the art already knows the various hydraulic system components required anyway, I'm not going to discuss the entire hydraulic system in complete detail. I'll discuss in detail only those components with specific specifications for my invention.

For instance, the diameter of the hydraulic cylinder required for a particular block size of my design can be determined by using the following formula. Multiply 0.7845×diameter×diameter×the hydraulic systems working pressure=total pressure generated. Simply use any hydraulic cylinder manufacturer's catalog to choose the correct diameter cylinder or cylinders as required. Then, determine the volume of the chosen cylinder or cylinders to compute the necessary flow rate to cycle the unit within the recommended time frame. Since I need to know the maximum stroke length of the hydraulic cylinder to complete the flow rate calculations, I offer the following. I prefer to advance a compacted lift 6", or the same distance as a maximum lift thickness. By adding the 12" of loose material to the 6" of advancement, I can conclude that the maximum stroke length for any of my designs will never exceed 18", no matter how large (cross-sectional dimension) of a block to be produced.

With the above supplied hydraulic system specifications; anyone skilled in the art, can design a compaction unit of my invention and balance the hydraulic system components to meet my design specifications. Of course, this is only my recommendation for CEB and SCEB machines. Other uses of this invention may require different hydraulic system specifications. So, I am furnishing specifications as a matter of guidance and not of limitation.

Controlling Loose Lift Volume in the Ramming Chamber

It is very important for a rather constant amount of block-making material (e.g., earth) to enter the ramming chamber for proper compaction to occur. Since earth can vary widely in consistency, it is necessary to be able to adjust the volume (volume occupied by a loose lift) in the chamber to match varying conditions. My design can easily be adjusted in three ways. I can reduce the volume in the ramming chamber by shortening the outgoing compression stroke. I can also shorten the retraction stroke. Or, I can do a combination of both. Any method will result in a smaller overall area or volume for the loose lift to occupy.

In a manually controlled unit, I usually prefer to shorten the retraction stroke of the hydraulic cylinder. This can be accomplished by placing physical stops (PS) behind the ramming head 20. When rod 13 is retracted then ramming head 20 will engage the physical stop (PS). Thus, it is easy to adjust the volume of earth within a chamber without utilizing any outside measuring device. In semi-automatic and fully automated systems, a combination of physical stops (PS) and measuring devices (MD) can be utilized to control overall stroke length and thus chamber volume.

Detailed Description of Shearing Chamber 60

Figure 6B:
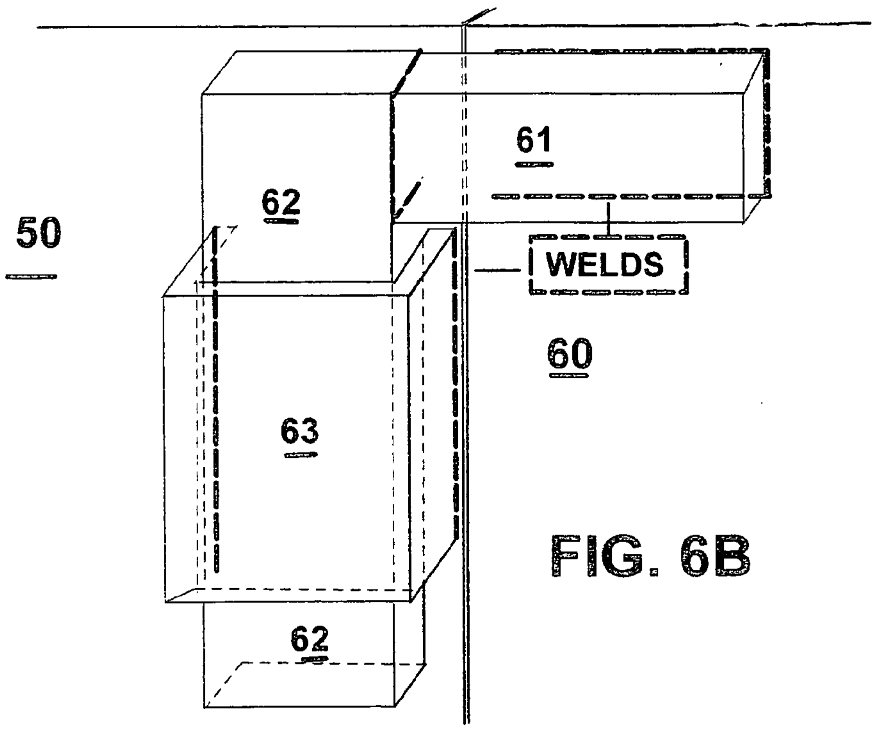
FIG. 6B shows a close-up view of the slide mechanism that attaches the shearing chamber to the ramming chamber.
Figure 6C:
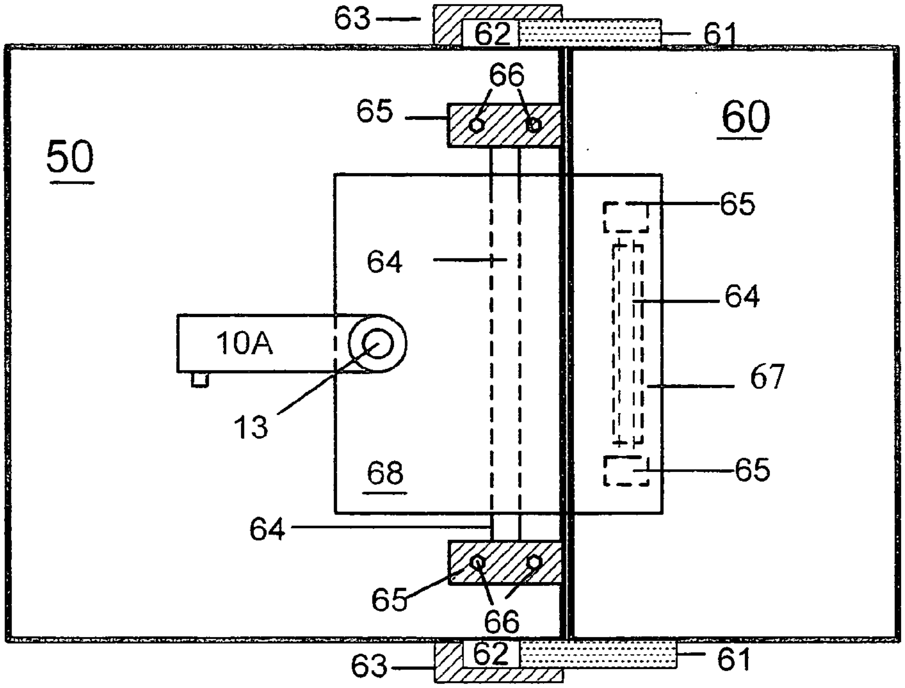
FIG. 6C is a bottom view of an illustrative embodiment depicting the lever and fulcrum mechanism, and low profile hydraulic cylinder (part of an actuator) for activating the shearing chamber.

A shearing station or chamber 60 is illustrated in FIG. 6A. I especially recommend this method for semi-automatic, and automated units. With this method, shearing chamber 60 has essentially the same cross-sectional profile as ramming chamber 50. Shearing chamber 60 is rigidly attached to the end of ramming chamber 50 and held in near perfect alignment to each other. Thus, as a block 40 exits chamber 50, it immediately enters into shearing chamber 60. Chamber 60 is roughly 8"-12" long and open-ended just like chamber 50. I like to remove a few hundredths of an inch from the inside surface of chamber 60 to reduce frictional loading. This allows block 40 to progress through chamber 60 and continue on down a support structure 70, while encountering very little resistance. The shearing chamber 60 is held in rigid alignment to ramming chamber 50 by a sliding mechanism. See FIG. 6B where arc-weld locations are indicated by the darkest skipped lines. Parts of a heavy steel support plate 61, are welded to the sides of shearing chamber 60 as indicated. The other end of plate 61 is welded only to bar-stock 62. Heavy channel structure 63 is welded to the sides of ramming chamber 50. This allows bar-stock 62, which moves freely within channel 63, to fit flat against ramming chamber 50. This arrangement keeps chamber 60 tight against the exit end of chamber 50 but allows chamber 60 to move a short distance in only one plane or axis. This distance is less than the height or transverse dimension of chamber 50 and need not exceed ½" to fracture or split the largest CEB block 40 cleanly along this plane of movement. A vertical movement is preferred so that chamber 60 is forced up to fracture the block, then back down (gravity assisted) to its original position; which, is again in near perfect alignment with chamber 50. Movement to chamber 60 is provided by a lever/fulcrum device, which moves shearing chamber 60 up then back down into alignment with compression chamber 50. Lever 68 attaches to fulcrum 64, which is supported by a couple of pillow block bearings 65. Bearings 65 are attached by a series of bolts 66 into the bottom of chamber SO. Lever 68 forces a cylindrical roller 67 into contact with the bottom of chamber 60 when a low profile hydraulic cylinder 10A (part of an actuator) is activated. Lever 68 transfers energy to cylindrical roller 67 forcing shearing chamber 60 upwards. This force fractures or breaks block 40 cleanly along the points of contact between ramming chamber 50 and shearing chamber 60. In the most preferred embodiment, an electronic measuring device (MD) is preset to a desired block length and activates a solenoid valve (MV) when the desired length is obtained. Once activated, the solenoid valve (HV) completes the entire shearing cycle automatically. Since this action requires only milliseconds to complete there is no need to stop the compaction cycle of the unit; thereby, increasing the production efficiency of the compaction unit. In fully automated systems equipped with a microprocessor (MP), the desired lengths can be pre-programmed into the microprocessor (MP) or changed at will by manual input or by radio input (RR) for complete control of the entire production schedule. Additionally, various intermeshing features can be produced upon the ends of the sheared blocks by simply duplicating the desired pattern into the ends of the respective chambers.

It is highly preferred, for a conventional block support platform 70 to be directly attached to the output end of shearing chamber 60. See FIG. 6A. This keeps platform 70 in near perfect alignment with chamber 60 as it goes through the up and down movement of the shearing cycle and prevents the blocks from being otherwise broken. Platform 70 must be designed to handle the weight of the blocks to be produced. It must also be of sufficient length to support the maximum block length anticipated. On my units, I prefer about 10' of support platform 70, but I also consider anything over 20' as impractical for most applications. However, my compaction units are capable of producing extremely long blocks. The only limitation to block length is the support platform's ability to handle the weight and length of a particular block. Of course, numerous blocks of shorter length can be produced and stored on support platform 70.

Operational Sequence

Again referring to FIGS. 1A to FIG. 1D to best observe a basic compaction unit of my design going through a compaction cycle. Here's what happens in a compaction unit designed to produce a 5" by 11" block dimension. Let's assume I'm using a manual control system so I pull on the activation lever of the hydraulic control valve (HV). This will send hydraulic fluid to cylinder 10 and start the advance of ramming head 20 within chamber 50. The ramming head 20 will push the loose material 40A further within chamber 50. The hydraulic cylinder piston rod 13 proceeds until it reaches its full extension, usually about 18" in length. I stop cylinder 10 at this position by placing the hydraulic control valve (HV) into neutral. Since this is the first lift to be placed within chamber 50 it has nothing to compress against, so it just slides down chamber 50 ahead of head 20. Therefore, it is necessary to prime the unit by compacting the first lift. This is very simple to do. Just insert a ramrod of some sort, a shovel handle, 2"×4" wood plank, or other means inside the extrusion end 57 of the chamber 50 and pack the loose lift back against head 20. Once the loose material 40A is packed into place, I am ready to proceed. I now have a compacted lift 40C inside the ramming chamber 50, and a small amount of frictional threshold to compress my next lift against. As each new compacted lift 40C is added the frictional threshold pressure will increase, until a maximum pressure is reached for that particular length chamber. As I have said before, this pressure can be adjusted by simply controlling the length of the extrusion end 57 of chamber 50 during initial construction. The longer extrusion end 57 is the higher the frictional threshold pressure will be. In larger machines, I usually use a piece of mechanical equipment such as a backhoe bucket to block the exit end of the unit to start the compaction process.

Here's what's happening now that I have reached this point in the production process where extrusion end 57 of ramming chamber 50 is full of maximum density block 40. Start from the beginning of a cycle. See FIG. 1A. The loose material represented by 40A (e.g., earth) usually stored within a hopper 80, gravity feeds (for small machines—force fed for large block machines) into the area of the chamber now empty due to the compression of the previous lift 40C. The hydraulic system is activated. Head 20 begins to compress the new lift 40B against the previous lift 40C. See FIG. 1B. The pressure within the chamber will begin to rise as head 20 advances and starts compressing the lift.

Let's assume the hydraulic system is designed for 5000 lbs of system working pressure. I like to install a 5000 lb pressure gauge (SD) into the high-pressure side of the hydraulic system so that I can monitor compaction pressure. I already know I need to generate at least 132,000 lbs of pressure with the 5,000 PSI working pressure. Since I like to use off the shelf components, I chose a 7" diameter cylinder for hydraulic cylinder 10. I could just as easily have selected 2-5" diameter cylinders for the unit. With 5,000 lbs of system pressure, this 7" diameter cylinder can generate 192,423 lbs of total pressure. I can now compute the pressure gauge reading by dividing the 132,000 lbs of required compaction pressure by the area of the 7" diameter piston, which is 38.48 sq. in, and I should get 3,430.35 PSI. This tells me that I want the pressure gauge (SD) to read roughly 3500 PSI before the frictional threshold is overcome. In other words, the block 40 of compacted material located within the extrusion end 57 of the ramming chamber 50 should not move forwards until after the 3500 PSI shows on the gauge.

At this point my compaction unit 100 has accomplished two very important functions. It is generating the necessary compaction pressure to achieve the desired density in the lift, but it is also utilizing that same compaction pressure to fuse or combine the new lift 40B with the previous lift 40C to produce the continuous homogeneous block 40 that I desire.

As the hydraulic pressure within the system continues to build beyond 3500 PSI, it will eventually exceed the frictional threshold value of the block. When this happens block 40 within ramming chamber 50 begins to advance. This can best be seen in FIG. 1C. This is why I always want the hydraulic system to deliver at least 20% more pressure than the frictional threshold value. This allows cylinder 10 to easily advance the continuous homogeneous block 40 within chamber 50. Cylinder 10 will advance block 40 a distance equal to one compacted lifts thickness or generally 6" as represented by 40C in the drawings. This also means that during each complete compaction cycle of a compaction unit of my design generally 6" of block 40 will exit the unit.

Figure 1D:
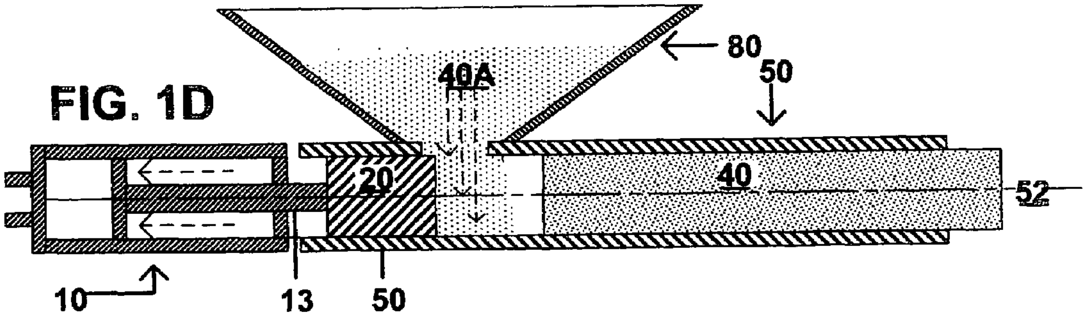
Figure 2A:
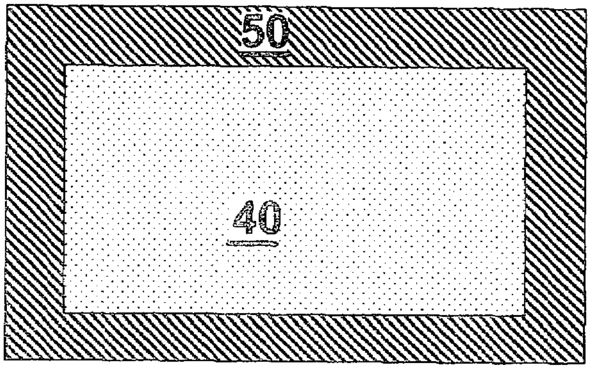
FIG. 2A to 2D is an end view of a ramming chamber showing a few of the possible shapes it can assume.
Figure 2B:
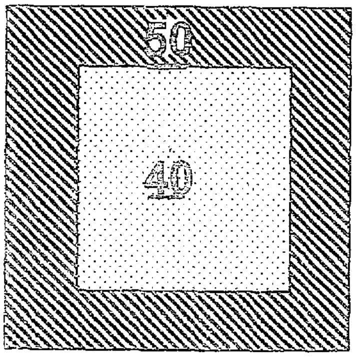
Figure 2C:
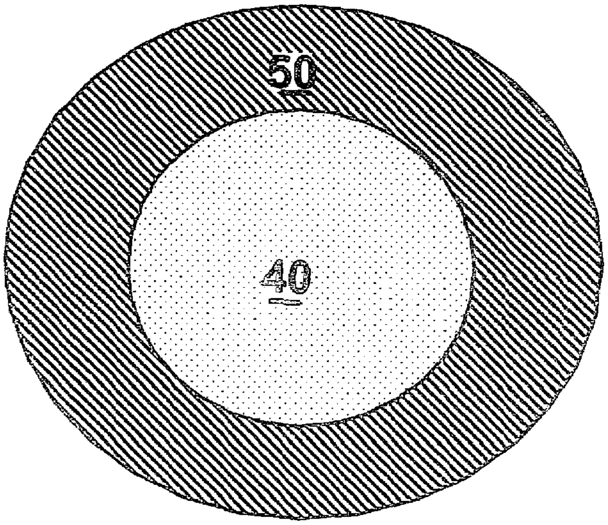
Figure 2D:
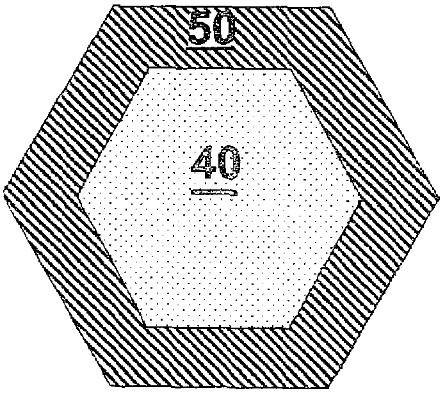

As soon as rod 13 reaches full extension, a pressure relief valve (HV) will engage, in this case I will have preset the value to around 4500 PSI. It is quite normal to hear a peculiar sort of squalling sound as this happens. This signals me to place the hydraulic control lever into the retraction position to start retracting ramming head 20. This is best seen in FIG. 1D. When rod 13 fully retracts or else head 20 comes into contact with a physical stop (PS), a preset pressure (generally less than 500 PSI) will be achieved and the hydraulic control valve (HV) will automatically (detent) go into neutral. As this is happening, loose block-making material 40A starts to gravity feed through fill port opening 51 into compression end 53. If everything is in proper adjustment, the amount of loose material 40A that enters the chamber will be almost identical to the first lift's 40A volume. In a small block size such as this, the compaction unit should complete the cycle within my specified 3-6 second time frame. This completes one full cycle of a manually controlled unit. And I'm ready to start a new compaction cycle by activating the control valve again.

Description of Semi-Automatic Units

In a semi-automatic compaction unit the compaction cycle is essentially the same. The only difference is in the way I control the compaction cycle of the unit. In semi-automatic units, I like to have a main control panel (CP) with a master start/stop button (CD) that can start the unit to cycling but can also immediately stop the unit anywhere during a cycle in case of an emergency situation. A combination of physical stops (PS), pressure gauges (SD) and electronic measuring devices (MD) can be utilized to control and adjust both the length of the compaction stroke and the retraction stroke of these units. These values are preset before the unit is placed into production. I also utilize electronic solenoid valves (HV) to control the hydraulic flow to these units. Once activated, the solenoid valve can control the entire cycle automatically. Once the start button is activated the electronic solenoid valve (HV) opens to supply the fluid to the hydraulic cylinder 10 and extend the compression stroke to the preset length. When this length is obtained, a sensing device (SD) may signal the solenoid valve (HV) to end this phase and reverse the direction of flow to begin the retraction phase of the cycle. Or, a preset working pressure limit within the electronic solenoid valve (HV) may trigger the valve to automatically reverse hydraulic flow to begin the retraction phase. During the retraction phase a sensing device (SD) or a physical stop (PS) may be employed to signal stopping the retraction stroke. Either way, the electronic solenoid valve (HV) automatically begins the compaction cycle once again. And so on, and so on, until someone manually shuts down the compaction cycle of the unit by pressing the stop button In large compaction units I like to force-feed the compaction chamber to prevent the loose earth from blocking the fill port opening 51. An agitation device (AG), which may be a hydraulically powered auger, conveyor belt system, shaker device, or rotating shaft with teeth, located within hopper 80, helps to ensure that the proper amount of loose material 40A enters ramming chamber 50. In commercial scale machines of my design a pulvi/mixer (P/M) may be incorporated directly into hopper 80 to thoroughly blend in stabilizing additives (Portland cement or asphalt emulsions) with earth to produce SCEB or Stabilized Compressed Earth Block.

Description of a Fully Automated Unit

Figure 5:
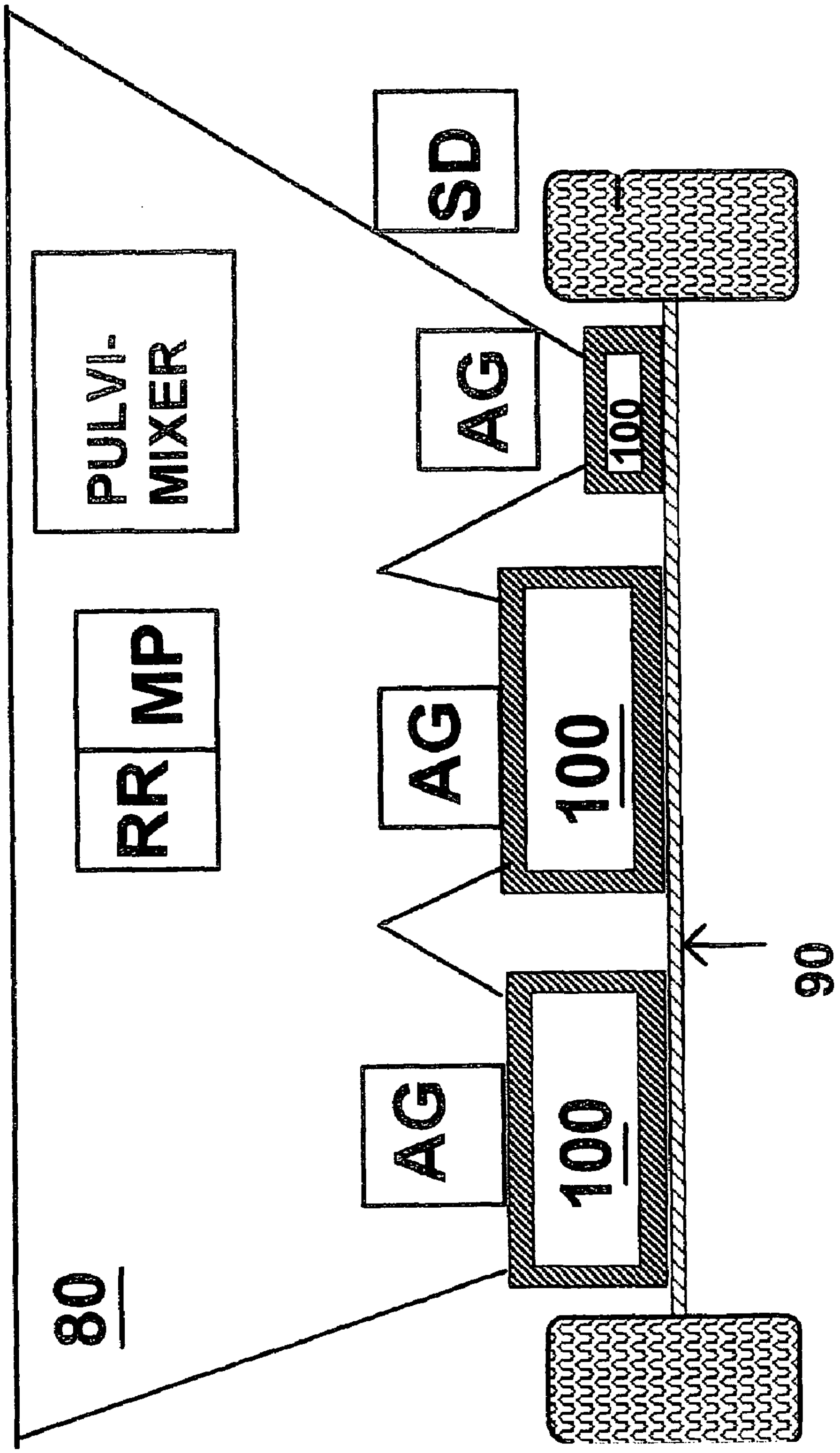
FIG. 5 is an end view of an illustrative embodiment of a multi-compaction unit machine mounted on a trailer with a single large hopper, single power source and microprocessor controls.

In a fully automated unit, everything will be controlled by a microprocessor (MP) with associated control devices (CD), which include various sender devices, and switches. Electronic sensing devices (SD) will monitor all aspects of the cycle including block length. The microprocessor (MP) will allow the compaction cycle to be paused momentarily during the loading phase of a compaction cycle. This pause in conjunction with an agitation device (AG) such as a hydraulic auger mounted vertically above fill port 51 is designed to ensure that the proper volume of earth enters chamber 50, especially in large block units. The pause will last a second or two at most. Then the cycle will continue as before. The microprocessor (MP) can be programmed to enable control of production timing, block length, block size production (on multiple-sized compaction unit machines), and monitor all systems for performance and maintenance parameters. I also prefer the microprocessor (MP) to have a radio receiver (RR), which may utilize current cell phone technology, "Blue Tooth" technology or wireless internet technology. Thus, an operator or designated person can change the production schedule from a distance such as from a nearby office trailer or vehicle without having to shut down the block-ramming machine. A typical scenario would be for the operator to call up the ramming machine by simply dialing a standard cell phone number. After the microprocessor answers, the foreman would enter a security code that allows him or her access to the production schedule. The operator could then change the production schedule in the same manner as any other automated answering service does utilizing touch-tone phone input. A different scenario involves using a computer to computer wireless link to accomplish the scheduling changes. All designs having a microprocessor will have a basic keypad entry system allowing an operator to manually change the production schedule directly from the block-ramming machine. Block-ramming machines equipped with a radio receiver are most preferred on complex multi-compaction unit block-ramming machines as illustrated in FIG. 5.

It should be appreciated that the simplicity of my design will allow anyone skilled in the art to easily construct the semi-automatic and fully automated control systems I discuss. Indeed, present state of the art CEB machines are infinitely more complex in their production cycles. This includes the majority of U.S. models which feature fully automated units controlled by microprocessors.

Process of Utilizing Mechanical Equipment to Handle Individual Blocks

One of the key disadvantages of the prior art was its inability to produce a large block size. This lack of size, which is okay and even desirable for manually placed blocks, has severely limited the utilization of CEB construction in industrialized cultures. But, to take advantage of the huge production potential of my block-ramming machines, I need a method of efficiently handling blocks that typically will weigh from 100 lbs to 5 tons and thus are too heavy for manual placement within a building system. For this purpose, I have developed a process for hoisting, maneuvering, and placing large bulky blocks within a building system. I begin by first modifying a clamshell grapple, or similar lifting device like those currently used on excavators and backhoes for lifting heavy bulky loads. A rotating clamshell grapple, which is a highly preferred lifting device, easily handles the large rock. A clamshell grapple can be easily modified, by adding lifting arms to the surfaces that are gripping the rock, to support and lift huge CEB blocks. A barrier lift, which is another preferred lifting device, is being utilized with a hydraulic excavator to carry a concrete barrier that weighs several tons. This combination of mechanical equipment and lifting device is highly preferred to hoist, maneuver, and place huge CEB blocks within a building system.

I create my special lifting devices by adding two (large surface area) lifting arms to a regular clamshell grapple, barrier lift, tong or similar-lifting device. I like to make the lifting arms out of steel normally ¾" thick by 6" wide by 4'-6' long. The lifting arms engage or contact the sides of the block to be lifted. These arms are attached to the lifting device through a swivel mechanism in such a manner so as to let them pivot or move within a small arc. This allows the face of the lifting arms to fit flat against the sides of a variety of different width blocks. A rubber like material is added to the face of the lifting arms so that when the lifting device is lowered over a block the large surface area of the lifting arms cushions the sides of the block. The 4' to 6' width allows the lifting device to handle most blocks up to 10' in length, as the high-density blocks are self-supporting and will extend out past the lifting arms for some distance. This distance is dependent upon the thickness of a given block. In other words a 3' by 3' block will support itself allowing up to 4' of block to extend beyond the contact surface of the lifting arms on each end of the lifting device. An 8" thick by 24" wide block will not support itself for much more than 1' beyond each end of the lifting device. So the lifting arms overall length has to be adjusted according to the dimension of the block that you are working with. The same lifting device can be utilized to pick up and move blocks as short as 1' long.

If a powered rotating device is not used, I prefer to have a manually operated swivel device attached between the mechanical equipment and the lifting device so the load can be manually adjusted to align with the wall. Lets' assume the mechanical equipment is a hydraulic excavator, a very preferred power source due to its heavy lifting ability and 360 degree range of swing motion. Lets' also assume the lifting device is a rotating clamshell grapple with attached lifting arms. This makes it a simple task to reach over with the lifting device, align it along the blocks length and gently lower it over the block. The operator then closes the clamshell grapple, which forces the lifting arms to gently but firmly engage the sides of the block. The excavator supplies the power to operate the lifting device, hoist the block, maneuver the excavator if necessary, align the block with the wall system, and gently lower the block into place. The excavator releases the block by opening the lifting device, rotates around to pickup another block and repeats the process. Of course, the blocks do not have to be placed directly into a wall system. They might be placed on a pallet for curing or storage purposes. This allows a great deal of flexibility in the utilization of CEB and SCEB construction while removing a major obstacle, the high cost of manual labor. Since a trailer mounted or self-propelled block-making machine of my design is very mobile, the whole process is repeated by simply moving the equipment around the job site. The efficiency of the process is dependent upon the skill of the equipment operator, together with selecting the proper type of mechanical construction equipment that best handles the job conditions.

Ramifications

It should be appreciated that the combination of my block-ramming machines coupled with my utilization process will forever change the CEB and SCEB construction industry. This will allow the CEB industry to compete with other modern construction technologies on an even playing field.

Take for example, a block-ramming machine of my design setup to produce a 5" high by 11" wide block. If each lift is approximately 6" thick; by cycling my machine 2 times I produce a block 1' long. Each foot of block of this size weighs approximately 50 lbs; thus, by completing 4 cycles of my machine, which takes roughly 16 seconds, I can produce a block 24" long weighing roughly 100 lbs. An excellent wall width for housing purposes considering it takes at least 22" of wall thickness to take full advantage of the inherent thermal tempering characteristics that earthen walls possess. By cycling my ramming machine 20 times I can produce a block 10' long weighing roughly 500 lbs. This 11" wide block is very typically used for the interior walls of a house where only structural integrity is required. These block sizes fall within the range of weight that a standard backhoe can handle very efficiently. Instead of the 8-12 crewmembers required for a house being constructed with present CEB technology, my technology can be utilized to construct the same house with just 4 people. Here's how:

I first remove the digging bucket from a standard backhoe and replace it with an 8' truss boom equipped with a lifting cable and manual swivel mechanism attached to a modified barrier lift (lifting arms added). By employing one of my block-ramming machines with a 4 cubic yard hopper attached, the typical utilization process would go something like this. The backhoe operator would utilize the backhoe's front loader bucket to fill the 4 cubic yard hopper with loose block-making material. Then the operator would position or setup (place the stabilizer legs down) the backhoe between the block-ramming machine and the wall where the blocks are to be placed. A second person operates the block-ramming machine and helps the backhoe operator hook-up the modified barrier lift to the blocks. The backhoe swings the boom and attached barrier lift into position and gently lowers it over the block. Once in position the backhoe operator closes the barrier lift to engage the lifting arms into the sides of the block. The backhoe then hoists the block into the air, swings the boom around towards the wall, and gently lowers the block into position within the wall system. The two additional people help align the blocks being placed into the wall system and assist with other jobs as required. The block is gently released and the backhoe swings around to repeat the process. The extra reach of the truss boom allows the backhoe to place blocks within a 25' working radius, which is handy for reaching interior walls, and allows blocks to be placed up to 20' in height, all from one setup position. The 4 cubic yard hopper allows for the production of enough blocks to complete the construction sequence within this 25' working radius. Then the block-ramming machine (trailer mounted) is repositioned further along the wall section. The backhoe reloads the hopper with earth and the process is repeated again. Since my block-ramming machines produce a very consistent block height and width the "dry stack method" of placement can be utilized. In this method of CEB placement, a small amount of water is sprayed between each course of blocks. This creates a cushion of water that the blocks, in effect, float or slide upon making it very easy to manually maneuver very large blocks upon the wall. The water also acts as an agent to fuse the blocks together after only a minute or two. This gives just enough time for the block to be properly aligned (manually) with the wall. While the helpers are completing the manual alignment (by pushing or pulling on the block, never by lifting), the backhoe has reached over and plucked another block off the support platform and is swinging it over into place. Since it takes less time to physically align a smaller block compared to a larger block, this fits in perfectly with the production rate of the block-ramming machine, which is capable of turning out a 24" block every 16 seconds, a 10' block every 80 seconds, or anything in between at a comparable rate. Plenty of production to keep the backhoe busy during the placement cycle and a very efficient use of labor and machinery compared to the present method. Thus, this process presents a highly effective and cost efficient method of replacing human labor with mechanical power. This frees up human labor for other house building activities particularly more artistic creations within the home or structure.

Another typical application where mechanical equipment is absolutely necessary involves commercial multi-compaction unit block-ramming machines of my design. Lets' consider a multi-compaction unit block-ramming machine of my design mounted on a large commercial tractor-trailer rig. It has three individual compaction units, each compaction unit designed to produce a 3' by 3' block. I can pre-program this machine to turn out 10' long blocks in a staggered production sequence. So that as one compaction unit is completing a block, one compaction unit is ⅔ through the block production cycle and the last compaction unit is ⅓ through the block making cycle. A block-ramming machine of this design is capable of producing a 10' long block weighing roughly 5 tons every 66 seconds. That's enough CEB block to build a 3' thick by 9' tall wall that is 181' long in just one hour. So something like a large track excavator and appropriate lifting device to handle these large blocks efficiently is absolutely necessary. In this instance, I prefer a modified (lifting arms attached) clamshell grapple for the lifting device. This grapple has its own hydraulically powered rotational capability built into the grapple. This allows the excavators operator complete control of block alignment with the wall system.

Figure 7A:
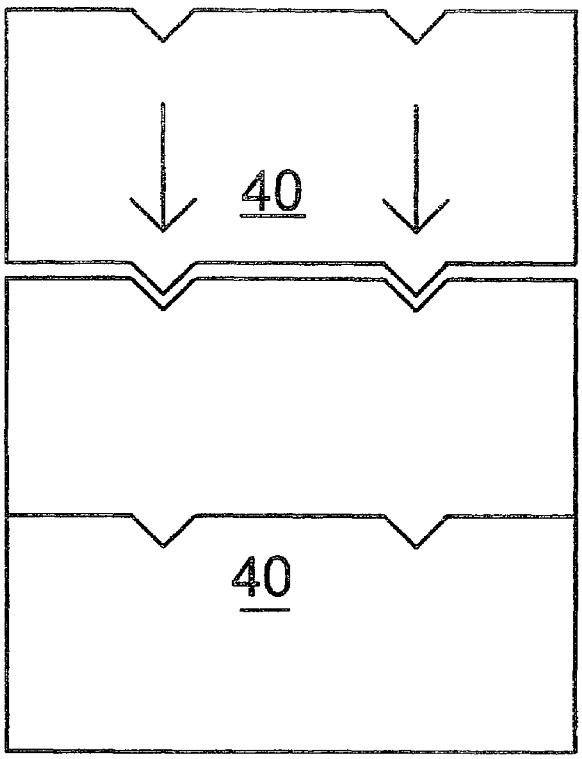
FIG. 7A shows a highly preferred self-aligning intermeshing block design.
Figure 7B:
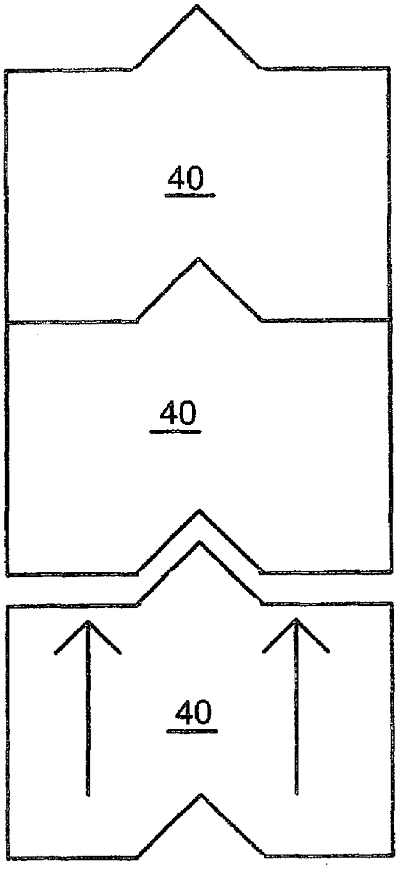
FIG. 7B shows an intermeshing design on the ends of a CEB block from top view-point

In addition, I prefer my block-ramming machine to produce CEB blocks with intermeshing V's upon the top and bottom of these large CEB blocks. Please see FIG. 7A of the drawing for an illustration of these features I also prefer the ends of the blocks to have an intermeshing design as well. These designs are imparted during the shearing process and are illustrated in FIG. 7B.

Again the dry stack method is utilized. Thus the intermeshing block surfaces only require spraying with a small amount of water before a spotter or foreman directs the excavator operator to release the block into place. But instead of having to physically maneuver a block of several tons into alignment with the wall, the intermeshing features provide a self-alignment tool during placement. As the block is lowered, the sides of the V-ridges slide against the sides of the V-valleys to align themselves within the grooves. Upon coming to rest the blocks are in almost near perfect alignment requiring no manual adjustment. The tops of the V-ridge can also be trimmed to allow for the placement of wiring, plumbing or steel reinforcement within the V-valley. To seal the block against the intermeshing features on the end of the block preceding it, the excavator can be used to gently nudge a 5-ton block into place. After about 45 seconds the water between the blocks is absorbed, rigidly fusing the blocks together. This locks the blocks into place and providing a rigid backstop for the next block to be pushed against.

With this combination of CEB production capacity, self-aligning characteristics and handling efficiency, an Army engineering unit can be deployed to construct whole complexes very quickly. This includes hospitals, schools, barracks, ammo depots, supply houses, retaining walls, guardhouses, roadblocks, and a multitude of other uses. Since the majority of the raw material is locally available (earth), the need to ship vast amounts of construction materials to remote places around the world, a very costly endeavor, is largely eliminated. The time required to build large structures is also dramatically reduced freeing military personnel for other duties. Additionally, in hostile territory a 3' thick CEB wall will be very comforting. Not only will it moderate the temperatures of the local environment saving on heating and cooling costs. But, due to the high-density of the 3' thick walls; neither, 50 cal. machinegun rounds nor rocket-propelled grenades will be able to penetrate the wall mass, possibly saving many human lives. Another additional benefit is that when the conflict is over, a bulldozer can easily recycle the structure back into native soils with minimal impact upon the local environment. Or with simple waterproofing techniques, a structure can be made to last for hundreds of years.

It is understood that the present invention is not limited to the embodiments described above, but encompasses any and all embodiments within the scope of the following claims.

I claim:

1. A method for producing a compressed earth block, the method comprising:

(a) providing a compression chamber with an elongated bore having an open outlet end;

(b) introducing into the bore of the compression chamber an amount of uncompressed earth; then (c) forcing the uncompressed earth toward the outlet end, which is blocked by previously compressed lifts of earth, against which the uncompressed earth is compressed into a new lift within the compression chamber; and (d) repeating steps (b) and (c) to provide a plurality of lifts compressed together within the compression chamber into a continuous length of compressed earth;

(e) separating an outer end portion from the continuous length to define a compressed block; and wherein step (e) comprises mounting a shearing station in alignment with the outlet end of the compression chamber and pushing the outer end portion of the continuous length from the compression chamber into the shearing station; and when the outer end portion of the continuous length protrudes out the open outlet end of the compression chamber by an amount equal to desired length of the block and into the shearing station, moving the shearing station transverse to the bore of the compression chamber then back again into alignment with the compression chamber while the outer end portion is in the shearing station to fracture the outer end portion from the continuous length.

2. The method of claim 1, wherein step (e) further comprises attaching an outlet end of the shearing station to a forward end of a support structure, such that the movement of the shearing station transverse to the bore of the compression chamber causes the forward end of the support structure to move transverse to the bore of the compression chamber in unison with the shearing station.

3. The method of claim 1, wherein step (e) comprises moving the shearing station transverse to the bore by an amount less than a transverse dimension of the bore.

4. The method of claim 1, wherein the transverse movement of the shearing station in step (e) occurs while simultaneously pushing the outer end portion of the continuous length from the compression chamber in step (c).

5. The method of claim 1, wherein step (d) further comprises varying the length of the outer end portion of the continuous length of compressed earth protruding from the compression chamber by measuring the length of the outer end portion before moving the shearing station transverse to the bore.

6. The method of claim 1, wherein the outer end portion of the continuous length of compressed earth protruding from the compression chamber in step (d) is made up of a plurality of lifts and has a length greater than 6 inches.

7. The method of claim 1, wherein the shearing station in step (e) has a bore with substantially the same cross-sectional dimensions as the bore of the compression chamber.

8. A method for producing a compressed block of earth, the method comprising:

(a) providing a compression chamber with an elongated bore having an open outlet end;

(b) introducing into the bore of the compression chamber an amount of uncompressed earth by feeding the uncompressed earth into the bore of the compression chamber from a port in the compression chamber; then (c) while the port remains open, stroking a ram into the bore of the compression chamber towards the open outlet end to apply a force to the uncompressed earth greater than an opposing frictional threshold force of all lifts of previously compressed earth in the bore, the ram blocking the port from the compression chamber as the ram moves past the port towards the open outlet end, preventing uncompressed earth from entering the compression chamber rearward of the ram as the ram is stroked forward; then (d) moving the ram in a rearward direction and repeating steps (b) and (c) to force a continuous length of compressed earth made up of a plurality of the lifts toward and out the outlet end; and (e) when an outer end portion of the continuous length protrudes from the outlet end of the compression chamber for a selected length, moving the outer end portion of the continuous length transverse to the compression chamber an amount less than a transverse dimension of the compression chamber to fracture the outer end portion from the remaining portion of the continuous length to define a compressed block.

9. The method of claim 8 further comprising forming mating indentations and protrusions on side surfaces of the continuous length of compressed earth as it is being formed and passes through the outlet end, so that after fracturing, an indentation on one of the compressed blocks is mateable with a protrusion of another block to form interlocking surfaces.

10. The method of claim 8, wherein the compressed block is made up of a plurality of the lifts.

11. The method of claim 8, further comprising:

placing a shearing chamber at the outlet end of the compression chamber; wherein step (d) comprises incrementally moving the continuous length directly from the outlet end into and through the shearing chamber with each of the strokes in step (c) until the outer end portion of the continuous length protrudes from the outlet end of the compression chamber by the desired length; and step (e) comprises moving the shearing chamber transverse to the longitudinal axis.

12. The method of claim 8, further comprising:

providing the ram with a convex protrusion, and engaging the uncompressed earth with the protrusion.

13. The method of claim 8, wherein step (e) comprises mounting-a forward end of a supporting surface to an outlet end of the shearing chamber, causing part of the outer end portion to be pushed onto the supporting surface, then moving the forward end of the supporting surface in unison with the compression chamber transverse to the longitudinal axis.

14. The method of claim 8, wherein at the conclusion of step (c) and before step (d), a forward side of the ram will be spaced forward of the port in the compression chamber.

15. The method of claim 8, wherein the length of the forward stroke in step (c) is substantially shorter than a longitudinal length of the compression chamber.

16. The method of claim 8, wherein as the ram moves forward in step (c), it closes off the port.

17. A method for producing a compressed block of earth, the method comprising:

(a) providing a compression chamber with a longitudinal bore having a longitudinal axis and an open outlet end, a hopper having a fill port on an upper side of the compression chamber communicating with the bore, and a ram that is movable within the bore from a retracted position on one side of the fill port to an extended position between the fill port and the outlet end;

(b) positioning a shearing chamber and a support structure at the outlet end of compression chamber, the shearing chamber having a passage and an aligned position in which an axis of the passage is aligned with the axis of the bore of the compression chamber, the shearing chamber having a misaligned position in which the axis of the passage is out of alignment with the bore;

(b) while the ram is in the retracted position, feeding a batch of uncompressed earth into the bore from the hopper through the fill port; then (c) while the fill port and the outlet end are open, stroking the ram forward, the ram closing the fill port as it moves toward the extended position, the ram having a longitudinal dimension that prevents uncompressed earth from falling into the bore of the compression chamber when the ram is in the extended position, the forward movement of the ram forcing the uncompressed earth contained in the compression chamber against previously compressed lifts of earth in the compression chamber to add a newly compressed lift to the previously compressed lifts, and when the force exerted by the ram overcomes the frictional threshold of the combined mass of the previously compressed lifts and the newly compressed lift, advancing the combined mass an increment forward; then (d) moving the ram to the retracted position and repeating steps (b) and (c), thereby fusing each newly compressed lift with all previously compressed lifts to form a continuous length of compressed earth, which progressively exits the outlet end into the passage of the shearing chamber with each newly formed lift;

(e) when a desired length of the compressed earth has moved through the compression chamber into the passage, moving the shearing chamber from the aligned position to the misaligned position then back to the aligned position while a portion of the continuous length of compressed earth remains in the passage to fracture from the continuous length a compressed block of the desired length, which is fully supported on the support structure.

18. The method of claim 17 further comprising forming mating indentations and protrusions on side surfaces of the continuous length of compressed earth as it is being formed and passes through the compression chamber, the indentations and protrusions being configured so that after fracturing, an indentation of one of the compressed blocks is mateable with a protrusion of another of the compressed blocks to form interlocking or self-aligning features.

19. The method of claim 17, wherein step (e) further comprises:

moving a forward end of the support structure in unison with the shearing chamber.

* * * * *